Patented May 29, 1951

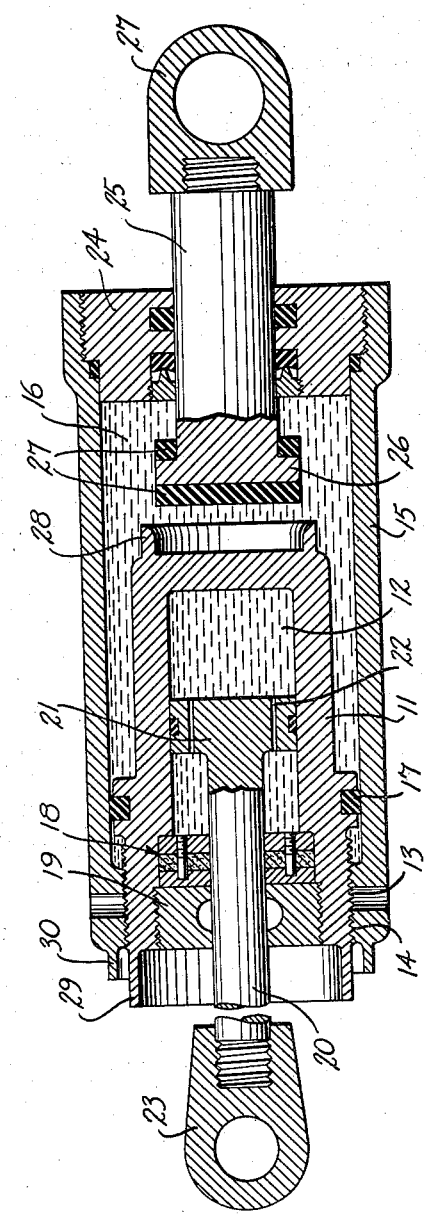
INVENTOR.
ARTHUR EDWARD BINGHAM
BY
Reynolds & Beach
ATTORNEYS

2,554,807

UNITED STATES PATENT OFFICE 2,554,807

SHOCK ABSORBER OR RESILIENT DEVICE

Arthur Edward Bingham, Cheltenham, England, assignor to Dowty Equipment Limited, Cheltenham, England Application June 22, 1948, Serial No. 34,397
In Great Britain July 16, 1947

9 Claims. (Cl. 267—64)

This invention relates to devices for affording resilient connection between two relatively movable parts of a vehicle or aircraft suspension system, and consists in a unit including a "high-pressure" chamber, a plunger movable under axial load into said chamber to achieve resilience by compression of liquid filling the maximum available space in the chamber, a damping head on the plunger partitioning the chamber to restrict the rate of relative recoil movement as between the plunger and chamber on relief of load acting in opposition to the resilient means, a "low-pressure" chamber, and a plunger movable between limits under axial load into the low-pressure chamber to achieve resilience by compression of liquid filling the maximum available space in the low-pressure chamber; said plungers being adapted to be connected outside the chambers to the two relatively movable parts of the suspension system, respectively.

This unit is capable of meeting demands upon a suspension system made by widely divergent conditions, i. e. small rapid undulations and larger undulations. The low-pressure chamber and plunger provide resilient resistance with little or no damping to the tendency for the wheel or other ground element to move out of contact with the ground surface when the vehicle is travelling over a surface with small rapid undulations, whereas the high-pressure chamber and plunger together with the damping means afford both resilient resistance and considerable damping when the ground element encounters larger undulations.

Percussion pads of rubber or the like are preferably provided at the limits of movement of the low-pressure plunger. When the low pressure plunger has reached either limit, continued axial load in the appropriate sense will be resisted solely by the action of the liquid in the high-pressure chamber.

The low and high pressure chambers and their respective plungers will generally be arranged co-axially of one another in tandem, and in such an arrangement and according to a further feature of the invention, the closed end of the high-pressure chamber forms part of the boundary wall of the low-pressure chamber and the two chamber-casings are adjustable relatively axially of one another so that, apart from movement of the low-pressure plunger within the low-pressure chamber, the volume of the low-pressure chamber may be adjusted to suit prevailing temperature conditions. It should be noted that although temperature effects on high-pressure liquid springs are small, they are quite appreciable on low-pressure liquid springs. The low and high pressure chamber-casings may be in threaded engagement with one another in which event the axial adjustment of the casings may conveniently be made, preferably with the guidance of a scale, by screwing or unscrewing the high-pressure chamber further into or out of the casing of the low-pressure chamber.

In order that the invention may be more clearly understood and readily carried into effect, one embodiment thereof shown in axial section in the figure of the drawing, will now be described in detail by way of example. In this embodiment, the casing 11 of a high-pressure chamber 12 is closed at one end and at the other end is formed with an external screw thread 13 which engages a thread on a reduced-diameter portion 14 of a tube-like member 15 forming part of the casing of a low-pressure chamber 16. The casing 11 is glanded at 17 against the inner surface of the tube 15 and is threaded internally at its open end for the reception of a gland 18 and gland nut 19 through which a plunger 20 is slidable. The plunger 20 has at its inner end within the high-pressure chamber 12 a damping head 21 which is a sliding fit in the bore of the casing 11 and is provided with flow restriction passages 22 through which liquid filling the maximum available space in the chamber 12 can pass from one side of the damping head to the other. Outside the chamber 12, the plunger 20 carries an apertured lug 23 by which the one end of the device may be positively connected to one part of the suspension system.

The tube-like member or casing 15 of the low-pressure chamber 16 defines an annular space around the casing 11 and extends beyond the closed end of the latter where the casing 15 is threaded internally to receive a gland nut 24 through which extends slidably a plunger 25 having within the chamber 16 a small head 26 with percussion pads 27 of rubber or like material. Externally, the plunger 25 carries an apertured lug 27 for connection with the other part of the suspension system.

The end face of the high-pressure casing 11 adjacent to the percussion pad 27 on the inner end of the low-pressure plunger 25 may be formed with an annular flange indicated by dotted lines 28 having an inner circumferential surface which converges way from the pad 27. When the plunger 25 approaches the inner limit of its movement with respect to the low-pressure casing 15 the said percussion pad 27 will be received in sealing fashion within this annular flange 28 to trap a quantity of liquid which thus forms a cushion.

The chambers 12 and 16 are each filled through inlet valves (not shown) with a suitable oil, the oil in the two chambers not necessarily being the same, and they may be initially pressurised. It will be understood that the chambers will be filled when the plungers are outermost, that is to say oil will occupy the maximum available space within the corresponding chamber.

In operation the oil in the low-pressure chamber 16 will provide resilient resistance without damping to the tendency for the wheel or other ground element to move out of contact with the ground surface when the vehicle is travelling over a surface with small rapid undulations, whereas the oil in the high-pressure chamber 12 affords resilient resistance with considerable damping when the ground element encounters larger undulations. As changes in temperature may have a noticeable effect upon the operation of the low-pressure chamber, provision is made whereby the volume of the low-pressure chamber may be adjusted in accordance with prevailing ambient temperature. For this purpose the casing 15 is arranged to be engaged by a spanner or other turning implement so that the casings 11 and 15 may be adjusted axially of one another. To facilitate adjustment, the casings 11 and 15 at the high-pressure end of the device may have overlapping co-axial flanges such as the flanges 29 and 30 which are suitably marked, e. g. as to "high," "medium" and "low" temperature.

Of the total maximum stroke of the two plungers, the low-pressure plunger may be capable of approximately one third of the total and the high-pressure plunger two-thirds.

The pressure ratio of the high and low-pressure chambers may be four to one or more, say 30,000 pounds per square inch maximum in the high-pressure chamber and 7,500 pounds per square inch maximum in the low pressure chamber. When the high-pressure chamber comes into sole action at either limit of the movement of the low-pressure plunger, the rubber pads on the low-pressure plunger will facilitate a smooth transfer of load.

I claim:

1. A compressible unit for resiliently connecting and damping relative rebound movement of two relatively movable parts of a suspension system or the like, said unit comprising: a casing defining a closed first chamber, a first plunger projecting externally from and movable within said chamber, and of small volume relative to the chamber's total volume, to achieve resilience in said chamber solely by compression of liquid which fills all available space therewithin, and, to constitute a low-pressure resilient device; a second casing defining a cylinder, and a second plunger projecting externally from and movable within said cylinder under the influence of a force similarly directed to that force which causes inward movement of said first plunger, to achieve resilience also solely by compression of liquid which fills all available space within said cylinder, but said second plunger being of greater volume relative to the volume of its cylinder than is the first plunger relative to its chamber, to constitute a high-pressure resilient device operable simultaneously with the low-pressure resilient device; damping means operatively associated with the high-pressure device, organized and arranged to restrict its plunger's rate of rebound on relief of compressive load; and means carried by the external end of each plunger for operative connection thereof to the two relatively movable parts of a suspension system or the like.

2. A compressible unit for resiliently connecting and damping relative rebound movement of two relatively movable parts of a suspension system or the like, said unit comprising: a casing defining a first or low-pressure liquid-filled chamber, and a non-communicating second casing defining a high-pressure liquid-filled chamber, the liquid in each chamber filling all available space therein; a plunger projecting externally from each such chamber for operative connection to and movement with two relatively movable parts of the suspension system or the like, and both movable inwardly into the respective chambers, to achieve resilience solely by compression of the liquid which fills the same, under the influence of a common force such as tends to increase the load on the suspension system or the like; that plunger which enters the low-pressure chamber being of small volume relative to its chamber's total volume, and that plunger which enters the high-pressure chamber being of larger volume relative to its chamber's total volume; and damping means operatively associated with one such chamber and its plunger, organized and arranged to restrict its plunger's rate of rebound on relief of compressive load.

3. A compressible unit as in claim 2, characterized in that the low-pressure casing and the high-pressure casing are arranged coaxially in tandem, with the respective plungers movable inwardly in compression in mutually opposite senses, and with the closed end of the high-pressure chamber's casing forming at least a part of the boundary wall of the low-pressure chamber's casing.

4. A compressible unit as in claim 3, characterized further in the inclusion of means for relative axial adjustment of the two chambers' casings, for corresponding adjustment, independently of plunger movement, of the volume of the low-pressure chamber in accordance with prevailing temperature conditions.

5. A compressible unit as in claim 4, including axially disposed complemental screw threads interconnecting the two casings, whereby the high-pressure casing can be screwed into or out of the low-pressure casing, to constitute the means for relative axial adjustment.

6. A compressible unit as in claim 2, characterized in that the high-pressure casing is received substantially axially within the low-pressure casing, with its closed end in the vicinity of the inward limit of movement of the low-pressure plunger, and means within the low-pressure chamber, directly interengageable between said closed end and plunger, to damp out impact at such inward limit of movement.

7. A compressible unit as in claim 6, including a resilient percussion pad mounted upon the low-pressure plunger, in position to engage the closed end of the high-pressure casing, thus to constitute the impact-damping means, and in position to engage also the outer end of the low-pressure casing upon relief of compressive load, to damp impact.

8. A compressible unit as in claim 2, characterized in that the high-pressure casing is received substantially axially within the low-pressure casing, with its closed end in the vicinity of the inward limit of movement of the low-pressure plunger, a percussion pad mounted upon the low-pressure plunger, in position to engage directly the closed end of the high-pressure casing at such inward limit of movement, and an annular flange on said closed end, of a size and shape, and so located, as to receive as a dashpot said percussion pad as the low-pressure plunger approaches the inward limit of its movement, and thereby to cushion impact.

9. A telescopic shock absorber comprising a first chambered casing, a second chambered casing fitting and closing one end of said first casing, the latter being formed as a cylinder, two externally projecting plungers movable under axial compression in opposite senses, one into each chamber, to achieve resilience in each chamber solely by compression of liquid which fills the maximum available space within each such chamber, the capacity of the first chamber being less than that of the second, to constitute of such smaller capacity chamber a high-pressure chamber and of the other a low-pressure chamber, damping means operatively associated with the high-pressure chamber and its plunger to retrict such plunger's rate of recoil on relief of compressive load, and means carried by the projecting end of each plunger for operative connection thereof to two relatively movable elements.

ARTHUR EDWARD BINGHAM.

REFERENCES CITED

The following references are of record in the file of this patent:

UNITED STATES PATENTS

| Number | Name | Date |
|---|---|---|
| 1,918,697 | Gruss | July 18, 1933 |
| 2,107,494 | Onions | Feb. 8, 1938 |
| 2,130,885 | Johnson | Sept. 20, 1938 |
| 2,333,096 | Dowty | Nov. 2, 1943 |
| 2,357,505 | Crispell | Sept. 5, 1944 |